United States Patent [19]
Ishiguro

[11] Patent Number: 6,058,078
[45] Date of Patent: May 2, 2000

[54] INFORMATION RECORDING DISC DEMAGNETIZATION APPARATUS

[76] Inventor: Ken Ishiguro, 1871-4, Hashie-cho, Isesaki-shi, Gunma, Japan

[21] Appl. No.: 09/209,469

[22] Filed: Dec. 11, 1998

[30] Foreign Application Priority Data

May 15, 1998 [JP] Japan ................................ 10-132508

[51] Int. Cl.⁷ .................................................. G11B 13/00
[52] U.S. Cl. ............................................ 369/14; 361/267
[58] Field of Search ................................ 369/14, 15, 107; 360/66; 361/143, 149, 267

[56] References Cited

U.S. PATENT DOCUMENTS

| | | | |
|---|---|---|---|
| 3,647,990 | 3/1972 | Eul, Jr. et al. | 360/128 |
| 3,655,924 | 4/1972 | Puskas | 360/128 |
| 3,810,230 | 5/1974 | Orlowski et al. | 360/128 |
| 4,135,219 | 1/1979 | Yoshizawa et al. | 360/128 |
| 4,378,582 | 3/1983 | Maier et al. | 361/267 |
| 4,462,059 | 7/1984 | Yamagami et al. | 361/149 |
| 4,471,403 | 9/1984 | Dress, Jr. et al. | 361/149 |
| 4,617,603 | 10/1986 | Johnson et al. | 361/149 |
| 4,956,728 | 9/1990 | Hayata et al. | 360/66 |
| 5,220,474 | 6/1993 | Ohmori | 360/128 |
| 5,487,057 | 1/1996 | Bedini | 369/107 |

FOREIGN PATENT DOCUMENTS

| | | |
|---|---|---|
| 35-922970 | 12/1984 | Japan . |
| 36-307831 | 4/1988 | Japan . |
| 4-409366 | 3/1992 | Japan . |
| 4-523432 | 9/1993 | Japan . |

*Primary Examiner*—Tan Dinh
*Attorney, Agent, or Firm*—Townsend & Banta

[57] ABSTRACT

An information recording disc demagnetization apparatus according to the present invention demagnetizes information recording discs whose information is read by irradiating a laser beam, such as a music CD (audio compact disc), a photographic CD, DVD, MD, etc. The demagnetization process performed by the apparatus of the present invention successfully recovers tone quality, image quality, and the like, of the information recording disc, all of which are deteriorated by magnetism attained by the disc during reproduction of the disc.

The information recording disc demagnetization apparatus has a disc-shaped air-core coil for creating an alternating magnetic field having a decremental intensity, and a means for holding the information recording disc in a stationary state within the alternating magnetic field.

11 Claims, 17 Drawing Sheets

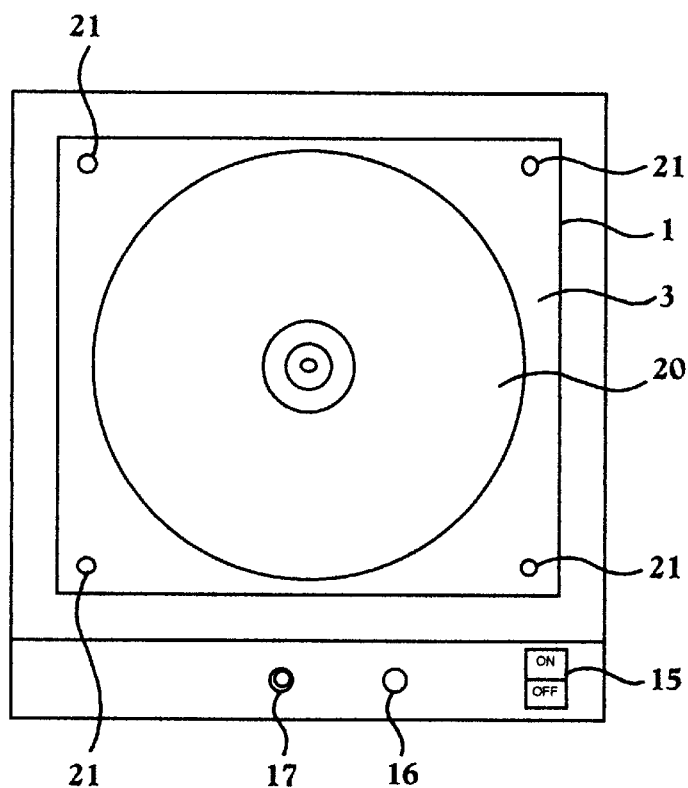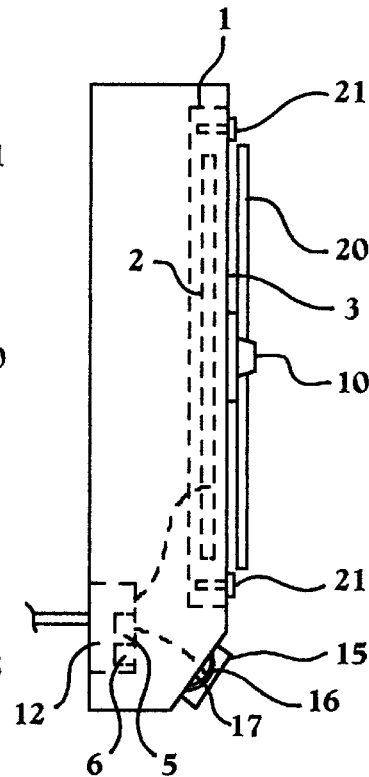

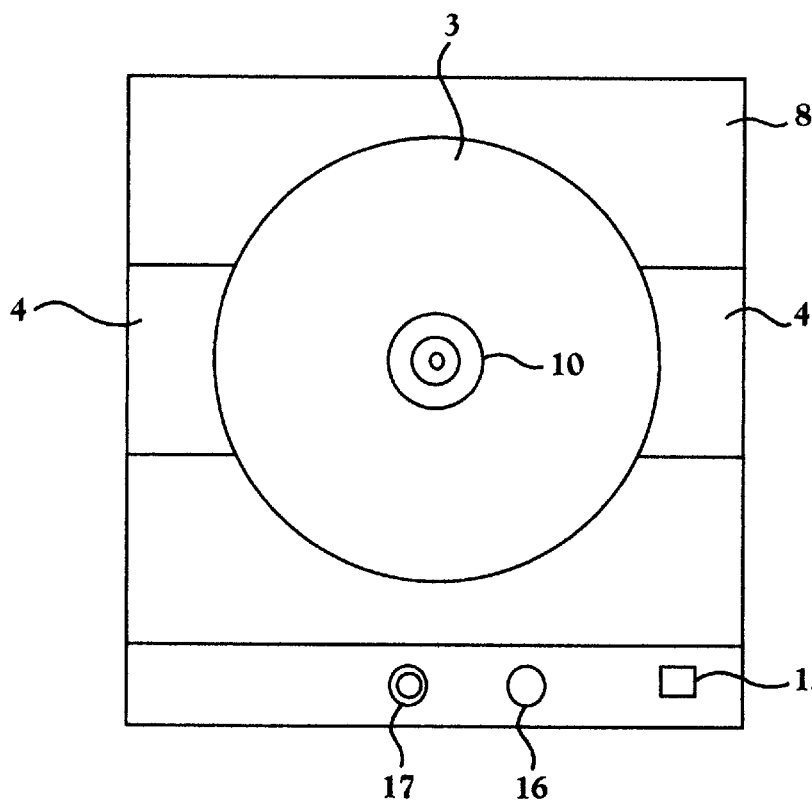
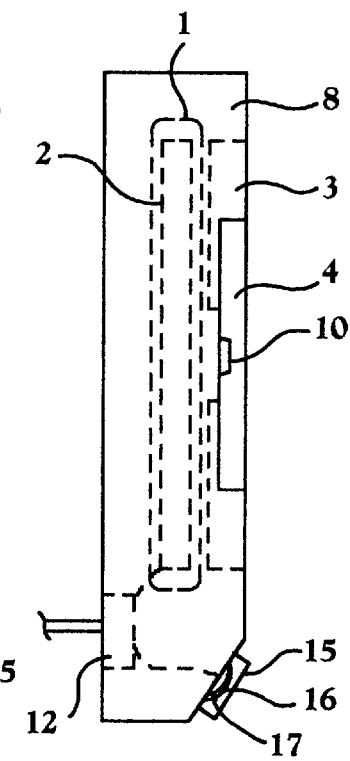
FIG. 2A  FIG. 2B
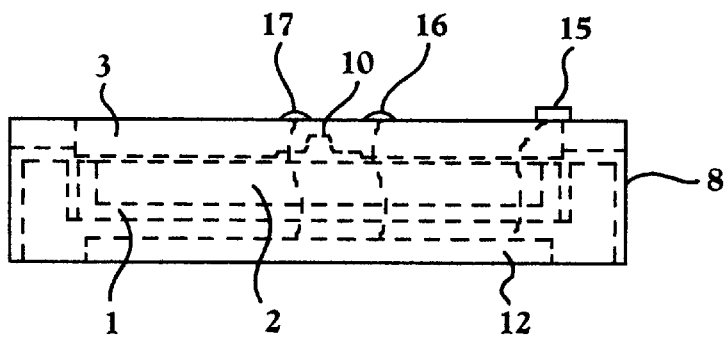
FIG. 2C

INFORMATION RECORDING DISC DEMAGNETIZATION APPARATUS

BACKGROUND OF THE INVENTION

1. Field of the Invention

The present invention relates to an information recording disc demagnetization apparatus for demagnetizing information recording discs whose information is read by irradiating a laser beam, such as a music CD (audio compact disc), a photographic CD, a game software CD, a DVD (digital video disc), an MD (mini disc) or a CD-ROM (read only memory), for the purpose of recovering tone quality, image quality and the like deteriorated by magnetism during reproduction.

2. Description of the Related Art

An information recording disc such as a music CD (audio compact disc), a photograph CD, a game software CD, a DVD (digital video disc), an MD (mini disc) or a CD-ROM (read only memory), in which various data and software is recorded, are made of resin such as polycarbonate and amorphous polyolefin, having a recording reflecting surface for recording a signal made of an aluminum foil. It is a widely accepted theory that information recording discs made of resin and aluminum foil are non-magnetic and, therefore, are not influenced by magnetism.

It is also generally believed that the information recording disc is a digital recording medium whose recorded information does not deteriorate even if it is reproduced a number of times. However, it has been found that tone quality and image quality deteriorate when the information recording disc is reproduced several times, and that after demagnetization processing is conducted on an information recording disc, the tone quality and image quality is improved when compared to the tone quality and image quality prior to the demagnetization processing.

It is therefore believed that the information recording disc, which is normally not considered to be influenced by magnetism is, in fact, magnetized during the reproduction process. To confirm this theory, the inventor of the present invention carried on experiments upon a music CD that had been used for 1.5 years and on a music CD that had been used for 2 years (both of which had been reproduced several tens of times). The quantity of magnetism of the label and signal surfaces thereof were measured with a gauss meter.

According to the results of the above experiments, the quantity of magnetism on the printed portion of a CD is a maximum of 1.5 gauss, considerably larger than the 0.5 gauss measured on other portions of the CD of magnetism. In fact, if a CD is suspended by a string, and a magnet is brought near the CD, the CD is slightly attracted to the magnet. Therefore, it is obvious that the information recording disc will be somewhat affected by magnetism.

It is believed that this increased magnetism found in the printed portion of an information recording disc such as a CD is due to magnetic substances contained in the paints with which the title of the CD, titles of musical compositions, names of performers, the name of a manufacturer, and the like, are printed on the rear surface (label surface) of the information recording medium.

The magnetic substances present in these paints are, for example, iron oxide, which is found in red paints, and cobalt, which is found in blue paints. In addition, aluminum foil, which is present on the recording reflecting surface of the information recording disc, is not 100 percent aluminum but, rather, contains small amounts of magnetic substances such as nickel, cobalt and iron. It is hypothesized that such magnetic substances are magnetized by the magnet of the pick-up unit of a reproduction apparatus.

Due to the fact that laser beams at the pick-up unit of the reproduction apparatus are electromagnetic waves, they are naturally deflected, refracted, distorted or the like by the influence of the magnetism of the magnetic information recording disc. As a result, tone quality and image quality deteriorate when the information recording disc is reproduced. It is therefore desirable to sometimes conduct demagnetization processing after the disc has been reproduced several times.

Demagnetizers for reducing or erasing the magnetism of a target apparatus have previously been available. Such demagnetizers include, for example, a tape deck head eraser as shown in FIG. 14, a demagnetizer for magnetic tapes as shown in FIG. 15, a demagnetizer for demagnetizing a machine tool such as a drill shown in FIG. 16 and an apparatus for improving the tone quality and image quality of a CD as shown in FIG. 17, which can overcome the problem of the magnetization of an information recording disc which is a target of the present invention.

The demagnetizers shown in FIGS. 14 and 15 can demagnetize an information recording disc (such as a CD) by tracing the upper surface thereof, whereas the demagnetizer shown in FIG. 16 can demagnetize an information recording disc by moving the disc thereon (an example of diversion).

In the CD tone quality and image quality improving apparatus shown in FIG. 17, the hole in the central portion of a CD is mounted onto a protrusion on the central portion of the demagnetizer, a start switch is depressed to rotate the CD at a high speed of several tens of seconds within the entire magnetic field which consists of the strong magnetic field of a permanent magnet, plus the magnetic field of a coil. This type of apparatus is described in U.S. Pat. No. 5,487,057 (patented on Jan. 23, 1996) in detail. However, if a magnetized information recording disc is rotated at high speed, as in the prior art apparatus mentioned above, it functions as a kind of dynamo thereby shaking its surroundings and inducing an electromotive force to surrounding wires, the power supply, and causing jitters.

The purpose of the CD tone quality and image quality improving apparatus 31, as shown in FIG. 18, is to reduce the relaxation noise of an information recording medium. The apparatus consists of a means for creating a modulated electromagnetic field, and a means for rotating the information recording medium to pass it through the modulated electromagnetic field. As shown in FIGS. 18 and 19, the apparatus includes a magnetic unit 32 consisting of permanent magnets 22 and a coil 23 wound around the magnets 22. By rotating the information recording medium or CD 25 at high speed within a magnetic field (the strong magnetic field of the permanent magnets 24)+(the magnetic field of the coil 23) created by the magnetic unit 32 for several tens of seconds by a motor 35, relaxation noise, that is, lingering noise within the recording medium conductor (or aluminum foil) is attenuated. The apparatus 31 further comprises a control switch 27, and a DC power supply 29.

The tape deck magnetizer shown in FIG. 14 is designed for a cassette tape and demagnetizes a narrow area. To demagnetize the entire surface of the information recording disc, it is necessary to move the demagnetizer over the recording medium a number of times. Therefore, use of this demagnetizer is time consuming and uniform magnetization is difficult to attain.

The magnetic tape demagnetizer shown in FIG. 15 is slightly wider than the tape deck magnetic eraser shown in FIG. 14. However, disadvantages in operability, time and uniform demagnetization remain. The tool demagnetizer shown in FIG. 16 is large and heavy. Therefore, it is not useful in demagnetizing home information recording discs.

In contrast to the apparatuses shown in FIGS. 14–16, the CD tone quality and image quality improving apparatus shown in FIGS. 17–19 is more convenient, time efficient and easier to operate. However, the apparatus fails to satisfactorily demagnetizate an information recording medium.

The apparatus shown in FIGS. 17–19 is intended to enhance the uniform magnetization direction of a magnetic substance by forcedly applying stronger magnetism to the substance rather than to carrying out demagnetization. Therefore, even if the effect of improving the tone quality and image quality is provided, the magnetic substances contained in the CD are uniformly magnetized and uniformly distorted. Laser beams from the pick-up of the hardware are also uniformly deflected. It is believed that, as a result of this uniform deflection, a deterioration in tone quality and image quality appears.

It is quite obvious that, by exposing the CD to the magnetic field of permanent magnets, magnetization of magnetic substances present in extremely small quantities in the CD occurs. The prior art apparatus described above does not, therefore, serve as a "demagnetizer".

As described above, the CD tone quality and image quality improving apparatus is advantageous in that the demagnetization process can be conducted on the entire surface of the CD at once. However, since this system utilizes high-speed rotation of the CD through the magnetic field of permanent magnets, magnetism may be increased or a non-magnetic CD may be magnetized depending on the state of magnetism on the CDs. It is also feared that a kind of dynamo phenomenon may occur due to the high speed rotation of the CD within the magnetic field. It should also be pointed out that a user might misunderstand that the CD has been effectively demagnetized because the tone quality or image quality changes after use of the demagnetizer.

SUMMARY OF THE INVENTION

It is, therefore, an object of the present invention to provide an information recording disc demagnetization apparatus capable of ensuring that magnetism on the entire information recording disc is uniformly and easily erased in a short period of time, and which, therefore, improves the tone quality and image quality of the information recording disc deteriorated by magnetization.

The present invention achieves the above object by providing a first embodiment comprising an information recording disc demagnetization apparatus for reducing or erasing magnetism magnetized on an information recording disc, comprising a means for creating an alternating magnetic field having a decremental intensity, and a means for holding the information recording disc in a stationary state within the alternating magnetic field.

The present invention further provides a second embodiment comprising an information recording disc demagnetization apparatus according to the first embodiment above, further comprising a means for creating the alternating magnetic field having a decremental intensity consisting of a coil, and a voltage control means for applying alternating voltage to the coil and decrementing the alternating voltage.

The present invention also achieves the above object by providing a third embodiment comprising an information recording disc demagnetization apparatus according to the second embodiment above, further comprising a voltage control means having a timer for setting the time that current is applied to the coil.

The present invention also achieves the above object by providing a fourth embodiment comprising an information recording disc demagnetization apparatus according to the third embodiment above, further comprising a voltage control means having a capacitor using, as an alternating voltage source, a commercial alternating current power supply applied to the coil, charged during applying current to the coil, and gradually discharged for 5 to 20 seconds after the period of time set by the timer, to thereby attenuate the applied alternating voltage to a zero voltage.

The present invention also achieves the above object by providing a fifth embodiment comprising an information recording disc demagnetization apparatus according to the second embodiment above, further comprising a means for arranging the information recording disc in a stationary state within the alternating magnetic field having a disc-shaped coil coated with resin, which is horizontally fixed to an upper surface of the body of the apparatus, and the information recording disc is directly mounted on the upper surface of the disc-shaped coil coated with the resin.

The present invention also achieves the above object by providing a sixth embodiment comprising an information recording disc demagnetization apparatus according to the second embodiment above, further comprising a means for holding the information recording disc in a stationary state within the alternating magnetic field, in which the disc-shaped coil coated with resin is horizontally fixed to an upper portion of the body of the apparatus, and wherein the information recording disc is mounted on the upper surface of the body of the apparatus.

The present invention also achieves the above object by providing a seventh embodiment comprising an information recording disc demagnetization apparatus according to any one of the second to sixth embodiments described above, wherein the coil is a disc-shaped, air-core coil having an outer diameter of 110 mm to 130 mm, an inner diameter of 10 mm to 32 mm, a thickness of 3 to 12 mm, and further wherein the coil is wound spirally from a vicinity of a center toward an outer periphery.

It has been experimentally shown by the inventor of the present invention that, if an information recording disc is subjected to demagnetization processing using the information recording disc demagnetization apparatus according to the present invention, the tone quality of the CD after processing is improved from that prior to processing.

BRIEF DESCRIPTION OF THE DRAWINGS

FIG. 1A is a top view of the information recording disc demagnetization apparatus of the present invention, showing a state in which a CD is mounted thereon.

FIG. 1B is a left side view of the information recording disc demagnetization apparatus of the present invention.

FIG. 1C is a rear side view of the information recording disc demagnetization apparatus of the present invention.

FIG. 2A is a top view of the information recording disc demagnetization apparatus according to another embodiment of the present invention.

FIG. 2B is a left side view of the apparatus shown in FIG. 2A.

FIG. 2C is a lower side view of the apparatus shown in FIG. 2A.

DETAILED DESCRIPTION OF THE INVENTION

Figure 3A:
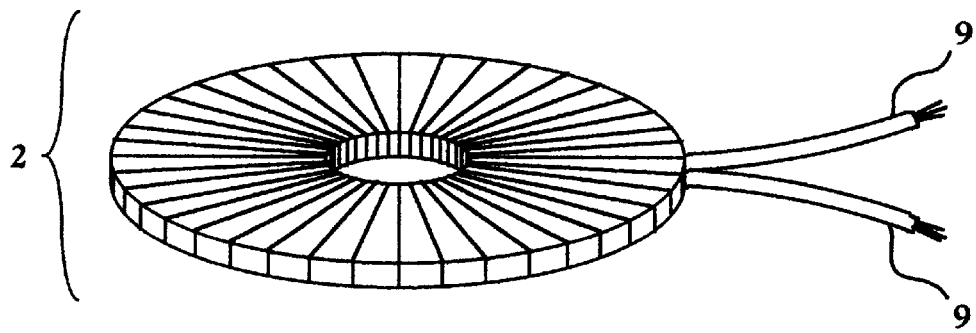
FIG. 3A is a perspective view of the coil contained in the information recording disc demagnetization apparatus of the present invention.

The information recording disc demagnetization apparatus according to the present invention is an apparatus for reducing or erasing magnetism contained on an information recording disc (such as a CD). It comprises a first means for creating an alternating magnetic field having a decremental intensity, and a second means for holding the information recording disc in a stationary state within the alternating magnetic field.

An information recording disc demagnetization apparatus 30 shown in FIGS. 1A, 1B, 1C and 4A comprises a coil 2 embedded (or molded) within a resin 1 and coated therewith, and a mount unit 3 provided to allow the information recording disc to be mounted on the upper surface of the resin 1. The coil 2 embedded within the resin 1 is screwed into an apparatus body 8. Furthermore, a timer 6, for setting the time voltage is applied to the coil 2, and a voltage control unit 5 for gradually decreasing the voltage applied to the coil, are provided within the apparatus body 8.

As shown in the information recording disc demagnetization apparatus 40 of FIGS. 2A, 2B, 2C and 4B, a coil 2 having the lower, side, or the entire surface thereof coated with the resin 1 may be fixedly and horizontally housed in the upper portion of the apparatus body 8. The mount unit 3 may be provided concentrically with or lower than a protrusion 10 integrally molded with the apparatus body 8, and a separate mount unit 4 may be provided for an MD on the sides of the protrusion 10 to allow two MDs to be simultaneously demagnetized.

Figure 3B:
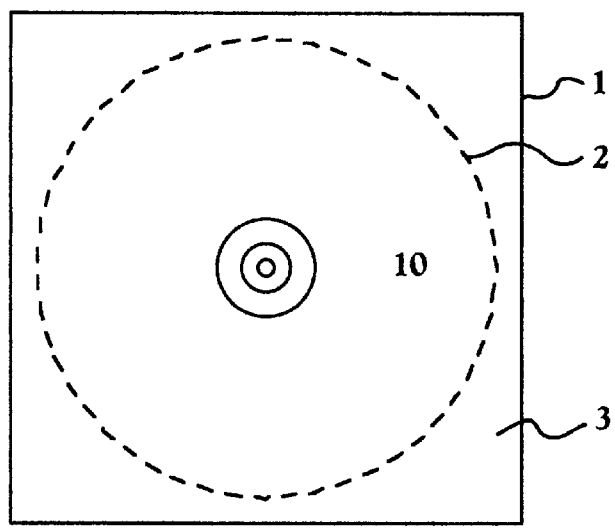
FIG. 3B is a top view of the apparatus having the coil coated with resin.
Figure 3C:
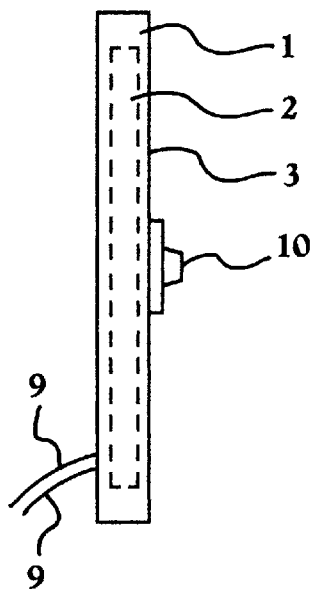
FIG. 3C is a left side view of the apparatus shown in FIG. 3B.

The coil 2 is an air-core and disc-shaped coil as shown in FIGS. 3A, 3B and 3C. A wire is wound spirally, and both terminations of the coil 2 are pulled outside to thereby serve as leads 9. (The line extended radially shown in FIG. 3A is a tape line taped with the coil) The optimum design for processing CDs, DVD's, CD-ROM's and MD's is an apparatus having a coil 2 with an outer diameter of 110 to 130 mm, an inner diameter disc-shaped, air core of 10 to 32 mm, and a thickness of 3 to 12 mm, wherein the coil is wound spirally from the center to the outer periphery.

In this embodiment, a wire formed into a disc shape is used, having a diameter of about 0.35 mm, about 4,200 turns, an inner diameter of about 30 mm, an outer diameter of about 130 mm, a thickness of about 7.95 mm and a resistance value of about 3400 Ω (L is about 940 mH in this case).

Figure 8:
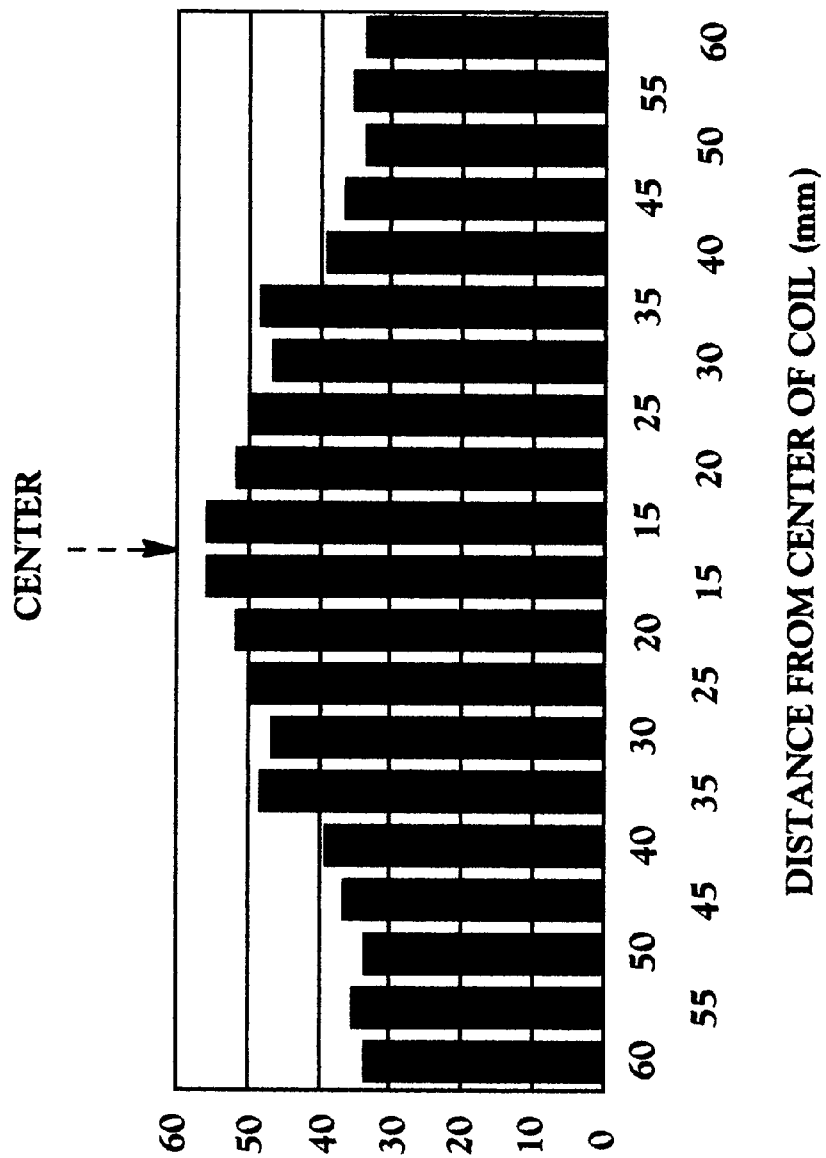
FIG. 8 is a measurement diagram showing the distribution of vector values of the intensity of a magnetic field in relation to the distance from the center of a coil.

When using the disc-shaped coil 2, vectors of the intensity of the magnetic field are almost uniformly distributed as shown in FIG. 8, although they are slightly higher in the vicinity of the center of the CD mounted above the coil 2. When measuring the vector values of intensity of magnetic field illustrated in FIG. 8, a constant current of 50 mA was applied across the coil, magnetic flux densities (gauss) were measured at intervals of 5 mm from the center of the coil in perpendicular and horizontal directions, and their composite vector absolute values were plotted as bar graphs.

The disc-shaped coil 2 thus manufactured is molded with the resin 1 into a sheet-shape with the lead 9 being drawn to the outside of the coil 2.

A protrusion 10 is projected upward on the central portion of the resin 1 within which the coil 2 is embedded. Therefore, it is possible to mount an information recording disc on the apparatus by fitting the opening hole 11 formed in the central portion of the information recording disc onto the protrusion 10.

Figure 4A:
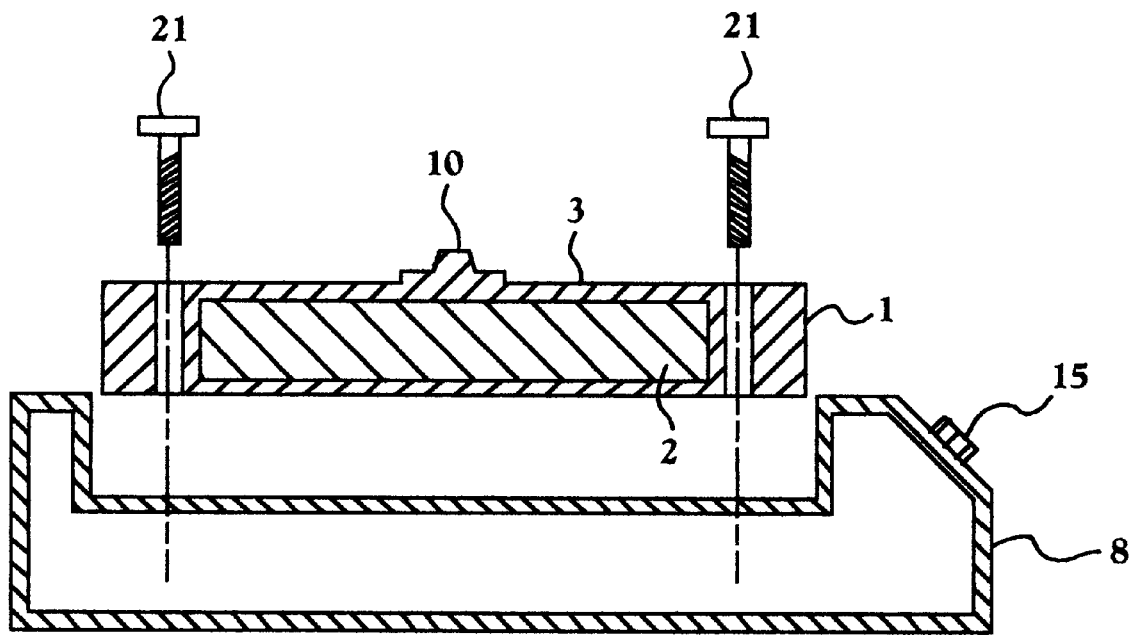
FIG. 4A is a side view of the apparatus of the present invention, illustrating the method of mounting a coil in the information recording disc demagnetization apparatus according to the present invention.
Figure 4B:
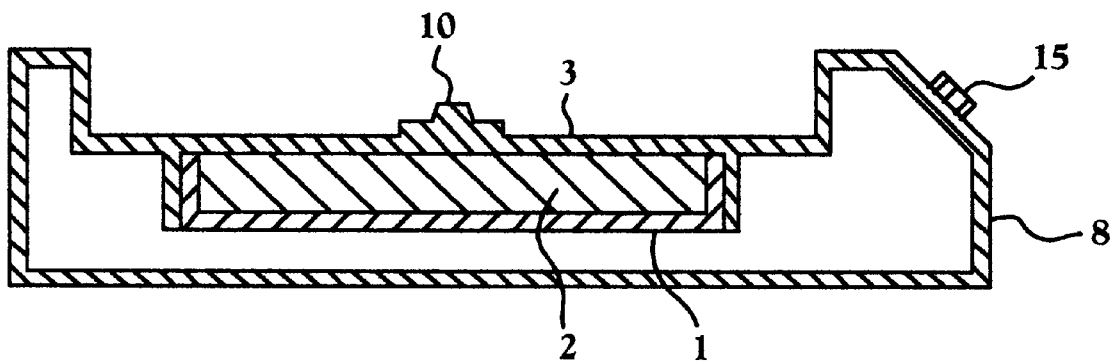
FIG. 4B is a cut-away side view of the apparatus of the present invention, illustrating the placement of the coil.

And, as shown in FIGS. 2 and 4B, since the protrusion 10 is integrally molded with the apparatus body 8, there is no need to project the protrusion 10 from the resin 1.

Figure 5:
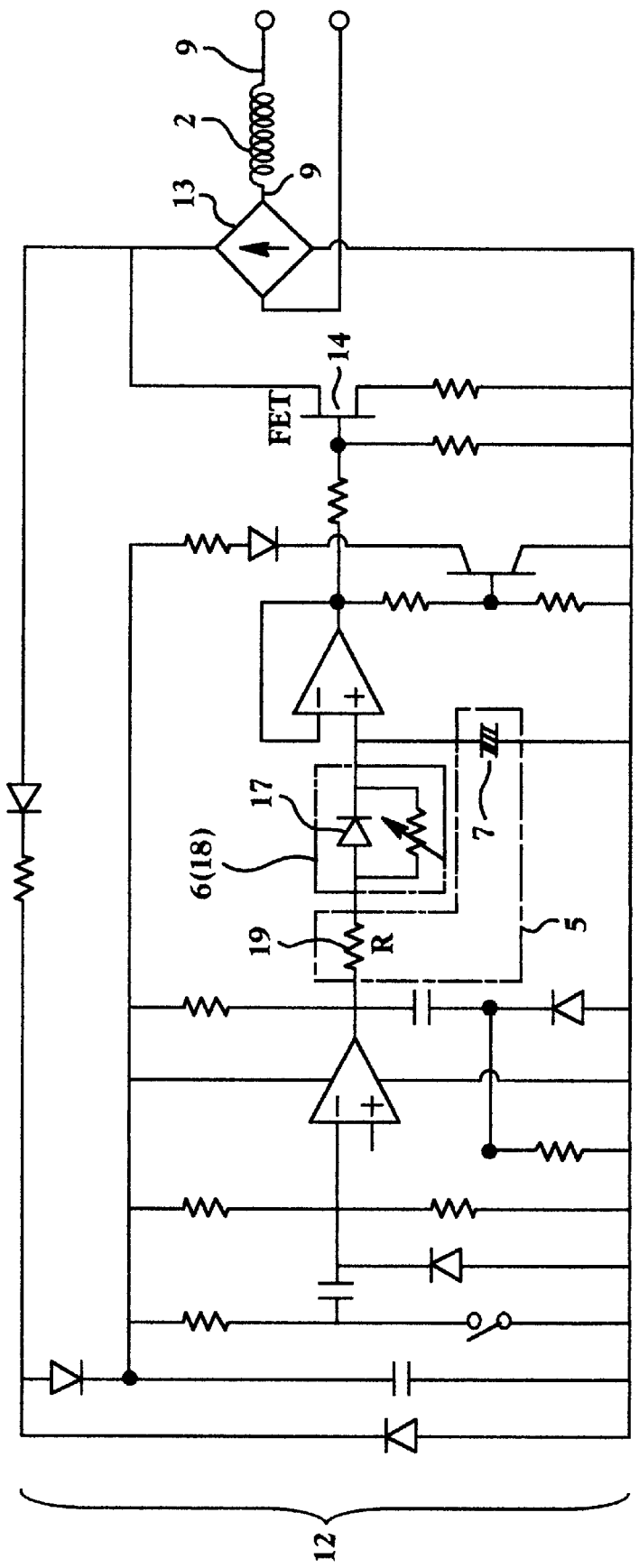
FIG. 5 is a circuit diagram of the information recording disc demagnetization apparatus according to the present invention.
Figure 6:
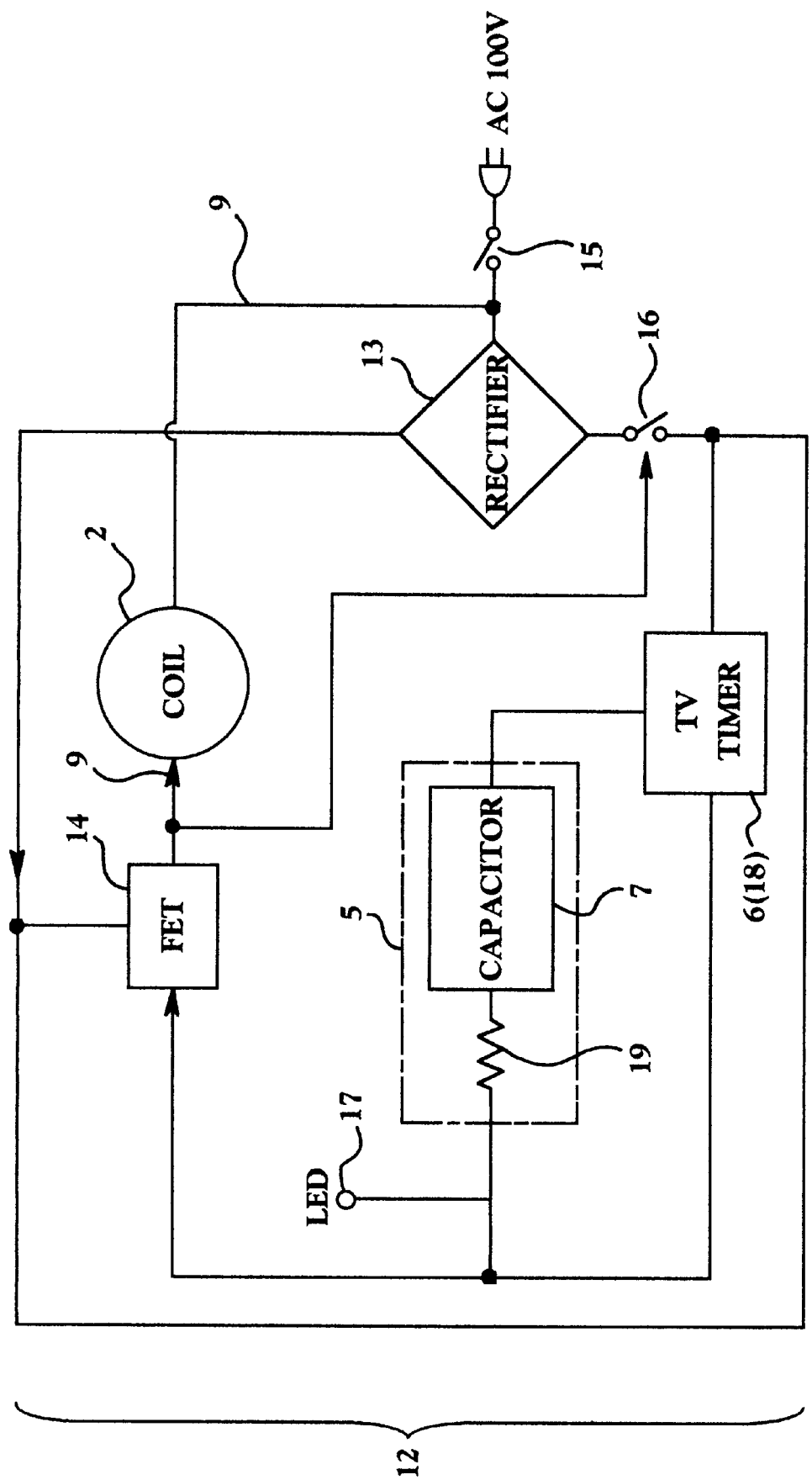
FIG. 6 is a simplified circuit diagram of the information recording disc demagnetization apparatus according to the present invention.

One of the leads 9 of the coil 2 molded as described above, as shown in the power supply circuit diagrams of FIGS. 5 and 6, is connected to a rectifier 13 of a power supply circuit 12, whereas the other lead 9 is connected to a switching device 14, such as an FET. The power supply circuit 12 is provided with a power supply switch 15, a demagnetization switch 16 for flowing current across the coil 2 and starting demagnetization, and an indicator 17, such as an LED, in which the LED lights during demagnetization and darkens after demagnetization. The power supply 15 and the demagnetization switch 16 are installed so as to be exposed to the surface of the apparatus body 8, thereby allowing a user to turn each switch on and off. A timer circuit 18 is set such that it can freely change the time (set the time) that the current is applied to coil 2, by changing the resistance value of a variable resistor. The set time is, for example, about 1 to 8 seconds.

In addition, a voltage control unit 5, as shown in FIGS. 5 an 6, is provided so that current is gradually decreased by the time constants R·C of a capacitor 7 and a resistor 19.

In the information recording disc demagnetization apparatuses 30 and 40, shown in FIGS. 1 and 2, respectively, if the power supply switch 15 is turned on and the main power supply is activated, a voltage of AC 1000 V flows across the rectifier circuit and is rectified. In this case, if the demagnetization switch 16 is turned on, DC current is applied by the rectifier 13 (or bridge diode) to the gate of the switching device 14 through the timer 6. The gate is then opened and the switching device 14 (FET: field effect transistor) is turned on.

Following this, the output current of the rectifier 13 flows across the coil 2 to thereby excite the coil 2. At the same time, a closed circuit consisting of the timer circuit 18—indicator LED—resistor 19—capacitor 7—timer circuit 18 is formed. As the timer 6 starts, the capacitor 7 starts to be charged. Current flows across the coil 2 for a period of time set by the timer 6 (about 1 to 8 seconds). After passage of this period of time set by timer 6, current with which the capacitor 7 is charged flows across the coil 2.

The current of the capacitor 7 is gradually decreased as discharge time passes. Namely, if the current from the capacitor 7 of the voltage control unit 5 passes through the resistor 19, then the current gradually decreases in accordance with R·C constants of the capacitor 7 and the resistor 19, and the voltage applied to the gate of the switching device 14 gradually decreases, thereby preventing the current flowing through the coil 2 from reaching zero.

By applying current to the coil 2, the coil 2 is excited, and the information recording disc 20 mounted on the coil 2 is demagnetized. This demagnetization process is based on a so-called loop attenuation demagnetization method to be described later.

Figure 7:
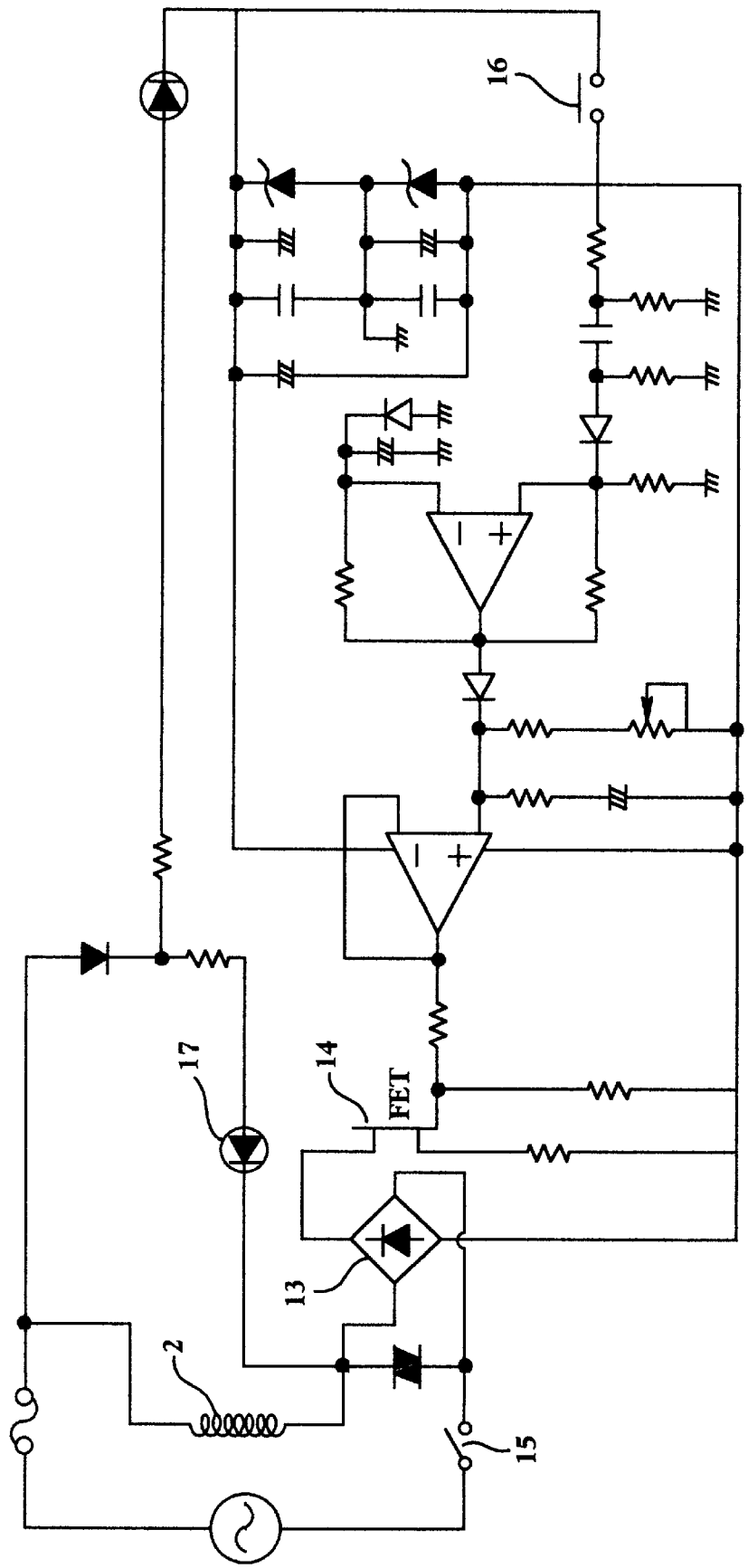
FIG. 7 is a circuit diagram of an embodiment of the information recording disc demagnetization apparatus according to the present invention.

FIG. 7, meanwhile, illustrates another embodiment of the power supply circuit. In this embodiment, a commercial AC power supply (100 V: 50 Hz or 670 Hz) is applied to a coil 2, and a rectifier 13 is connected in series with the coil 2. A switching device (FET) 14 for controlling current is provided between +, − terminals. The FET 14 is driven by an operation amplifier having a C·R time constant circuit to thereby control the drain current thereof. The current flowing across the coil 2 then decrements (by gate voltage control), and a decrement alternating magnetic field having the same frequency as that of the above-mentioned commercial alternating AC power supply is generated.

Figure 9:
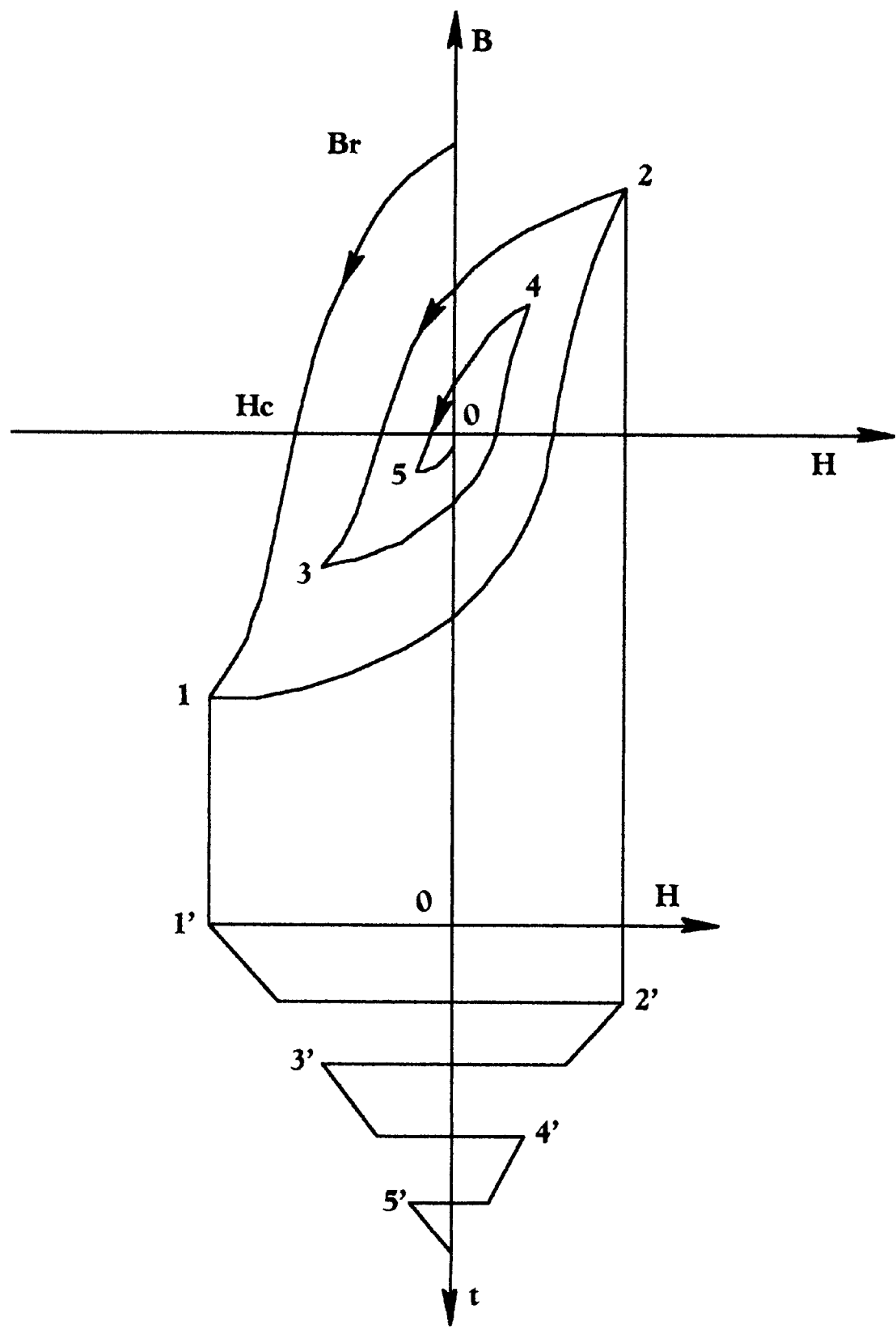
FIG. 9 is a graphical representation of the loop attenuation demagnetization method.

The above-mentioned loop attenuation demagnetization method, as shown in FIG. 9, utilizes a phenomenon wherein if a magnetic field H attenuating alternately to positive and negative in accordance with time acts upon a magnetic substance with remnant magnetism Br, the remnant magnetism Br of the magnetic substance attenuates along an hysteresis loop, then approaching the origin 0. This is called the "direct current demagnetization method" when the alternating magnetic field is of a low frequency (0.1 to 10 Hz), and "alternating current demagnetization method" when the alternating magnetic field follows the frequency of the commercial power supply (50 Hz or 60 Hz). The latter method is utilized in the present invention.

The simplest and most widely used alternating demagnetization method involves applying an opposing magnetic field, slightly greater than the already applied field, to a magnetic substance (twice or ten times higher than the coercive force shown in FIG. 9), and gradually attenuating the magnetic field for about five minutes. In particular, this is used in cases where the magnetic substance is made of a soft material.

Normally, when using the apparatus of the present invention, the information recording disc is originally a non-magnetic substance and the magnetic quantity of the coated surface and of the aluminum reflecting surface is very small. Therefore, it usually takes only about 5 to 10 seconds to carry out the alternating demagnetization method. This short duration of demagnetization can be demonstrated by magnetizing a thin iron piece (or iron sheet) by contacting it with a magnet, then subjecting the iron piece to demagnetization processing in the demagnetization apparatus of the present invention for several seconds. After demagnetization, the iron piece (or iron sheet) is completely demagnetized.

With the information recording disc demagnetization apparatuses 30 and 40 of the present invention, as shown in FIGS. 1 and 2, respectively, when current flowing across the coil 2 reaches zero, the demagnetization switch 16 is automatically turned off and the light of the indicator 17 is turned off, thereby allowing the user to confirm completion of the demagnetization process.

The information recording disc demagnetization apparatuses 30 or 40 are used according to the following procedures.

(1) The opening hole 11 in the central portion of the information recording disc is fitted onto the protrusion 10 of the information recording disc demagnetization apparatus of the present invention. When an MD is demagnetized, the MD is mounted on the mount unit 4 located on the sides of the apparatus body 8.

(2) The power supply switch 15 is turned on, thereby activating the main power supply.

(3) The demagnetization switch 16 is turned on, and demagnetization operation begins in accordance with the loop attenuation demagnetization method. Lighting of the indicator lights confirms that demagnetization operation is being conducted.

(4) At the end of the time period set by timer 6, the light of the indicator 17 is turned out, thereby confirming that demagnetization is complete. After confirmation of demagnetization, the information recording disc 20 is removed from the protrusion 10.

Figure 10:
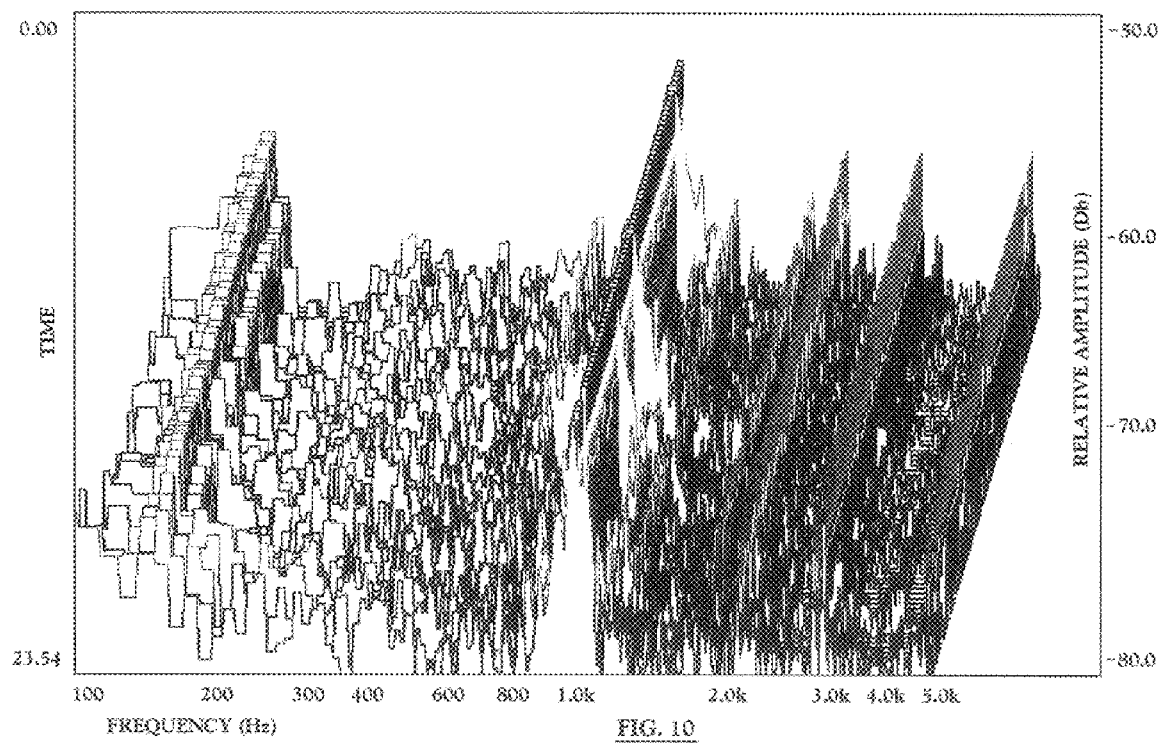
FIG. 10 is a three-dimensional graph, illustrating a 1 KHz signal of a prior-to demagnetization test CD wherein the CD was measured for 20 seconds with a spectral analyzer.
Figure 11:
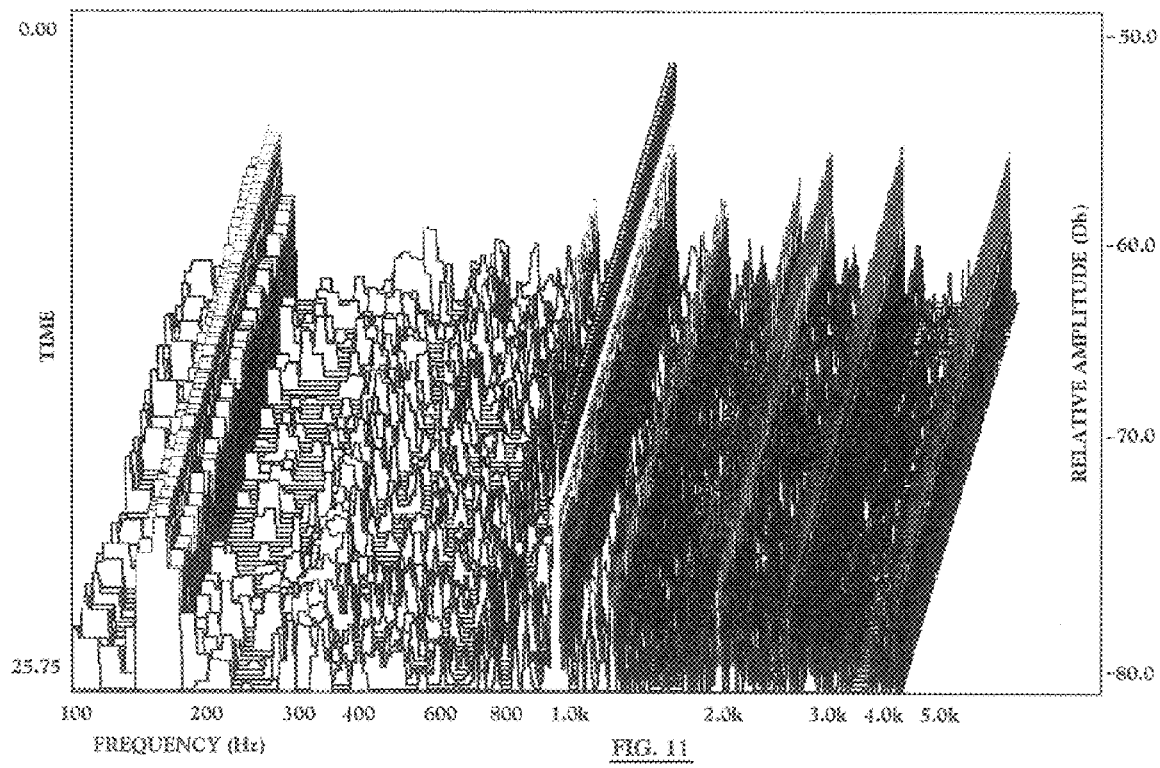
FIG. 11 is a three-dimensional graph, illustrating a 1 KHz signal of a test CD after demagnetization in the information recording disc demagnetization apparatus according to the present invention, wherein the CD was measured for 20 seconds with a spectral analyzer.

FIGS. 10 and 11 are three-dimensional graphs illustrating the results of experiments prior to and after demagnetization. The experiment was conducted by measuring a 1 KHz signal on the 12th track of an audio technica test CD (AT-CDL3) for 20 seconds by a spectral analyzer using the information recording disc demagnetization apparatus according to the present invention. It should be noted that the target signal is not only a 1 KHz sine wave, and signals with other bands or particularly harmonic signals are seen. In each graph, the X axis indicates frequency (0 to 5.0 KHz), the Y axis indicates relative amplitude, and the depth (normally Z axis) indicates time.

If the graphs of FIGS. 10 and 11 are compared, it can be seen that they are conspicuously different from each other.

That is, when observing the signal prior to demagnetization, crests other than a sine wave are generated in the 1 KHz signal components, which are considered noise or distortion components.

Likewise, white blank portions are seen in the 1 KHz signal components. It is believed that these blank portions are deficiencies in sound caused by read errors. Judging from the crests extending crosswise, it is also believed that the rise and fall of the sound becomes worse.

Moreover, dispersions and irregular portions are generated in bands other than 1 KHz, and an excessive amount of small crests are seen in the range of between 200 and 800 Hz. These small crests are also considered to be noise and distortion components.

After demagnetization, the excessive crests included in the 1 KHz signal components disappeared, as well as the blank portions. The crests also became uniform in height and the deterioration states shown prior to demagnetization almost disappeared. Therefore, when using the apparatus of the present invention, distortions were removed and sound, which could not be heard due to defects, could be heard after demagnetization.

The crests in other bands also became uniform and most of the excessive crests are gone in the range of between 200 and 800 Hz. Judging from these experimental results, the SN ratio improved greatly, and distortions in the audible range were considerably lessened.

Figure 12:
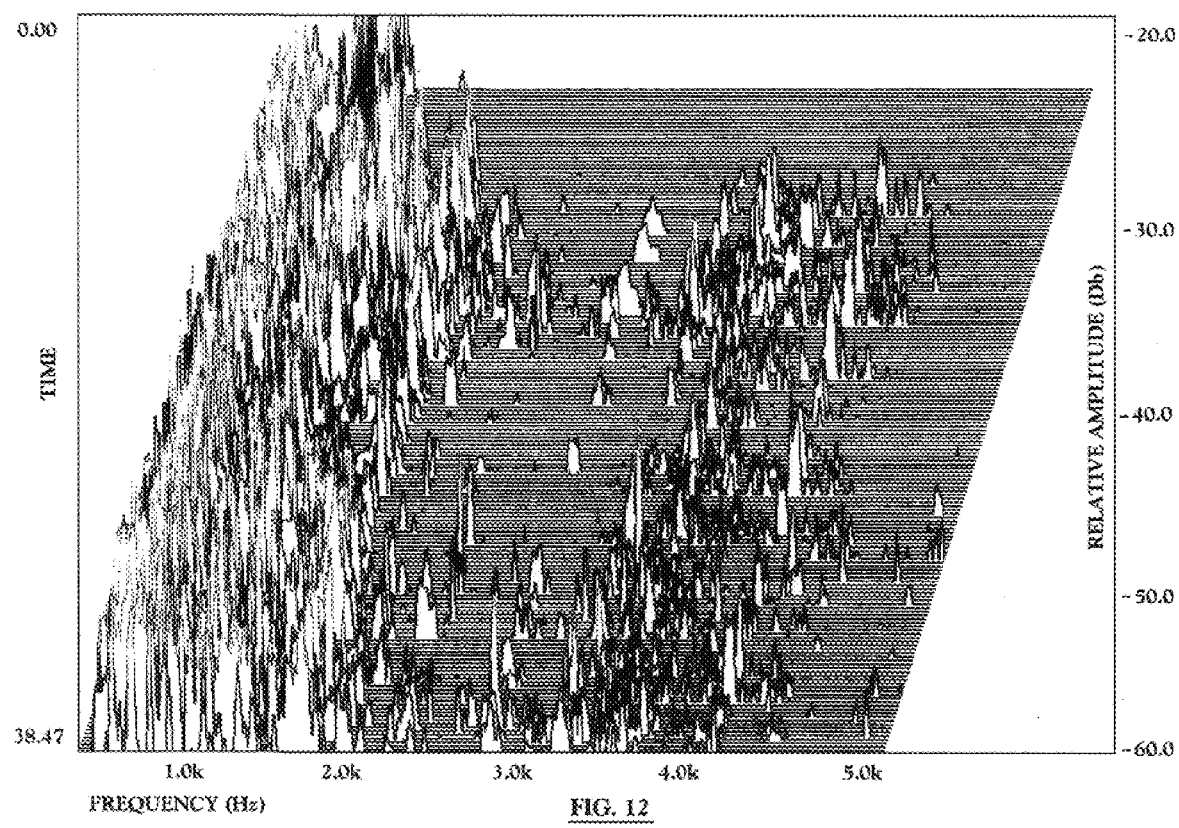
FIG. 12 is a three-dimensional trap, illustrating the signals of a used music CD measured for about 40 seconds with a spectral analyzer prior to demagnetization.
Figure 13:
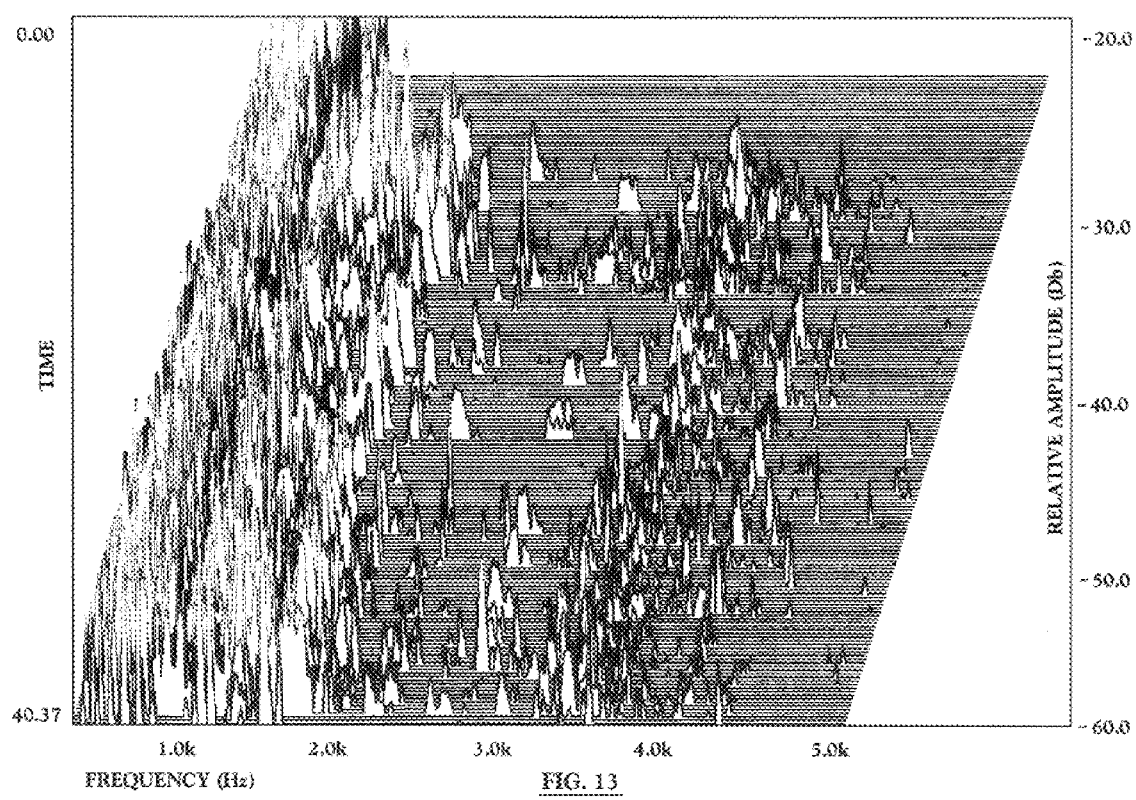
FIG. 13 is a three-dimensional graph, illustrating the signals of a used music CD measured with the above-mentioned spectral analyzer after demagnetization by the information recording disc apparatus according to the present invention.
Figure 14:
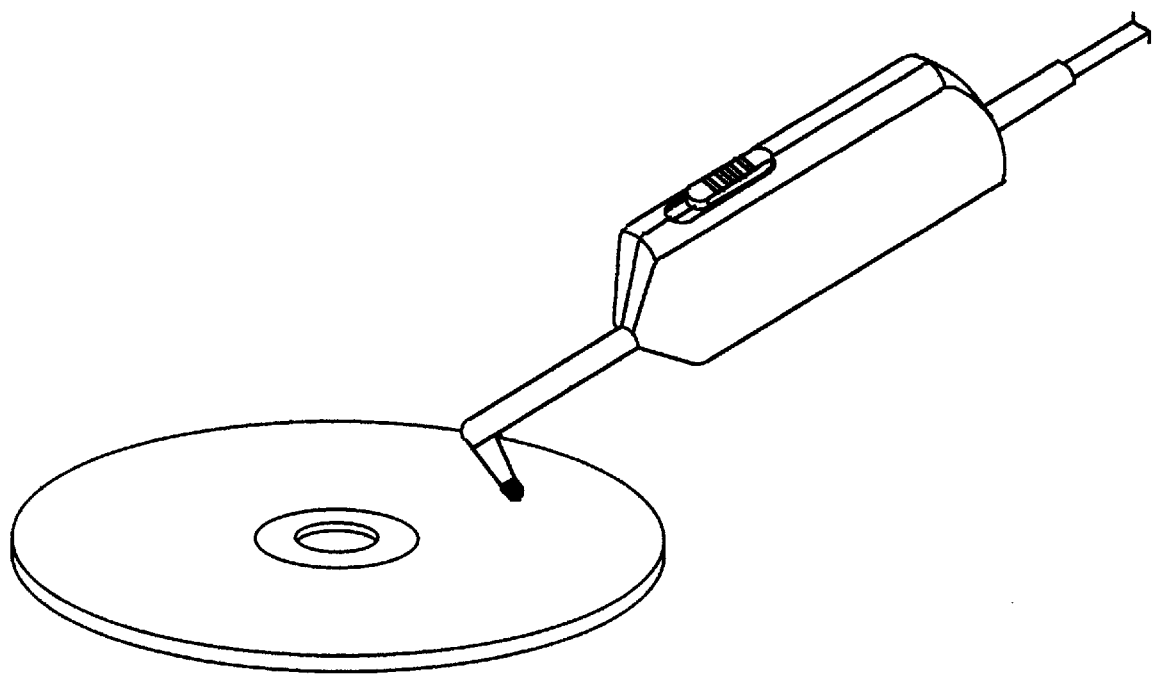
FIG. 14 is a perspective view of a tape deck head demagnetizer.
Figure 15:
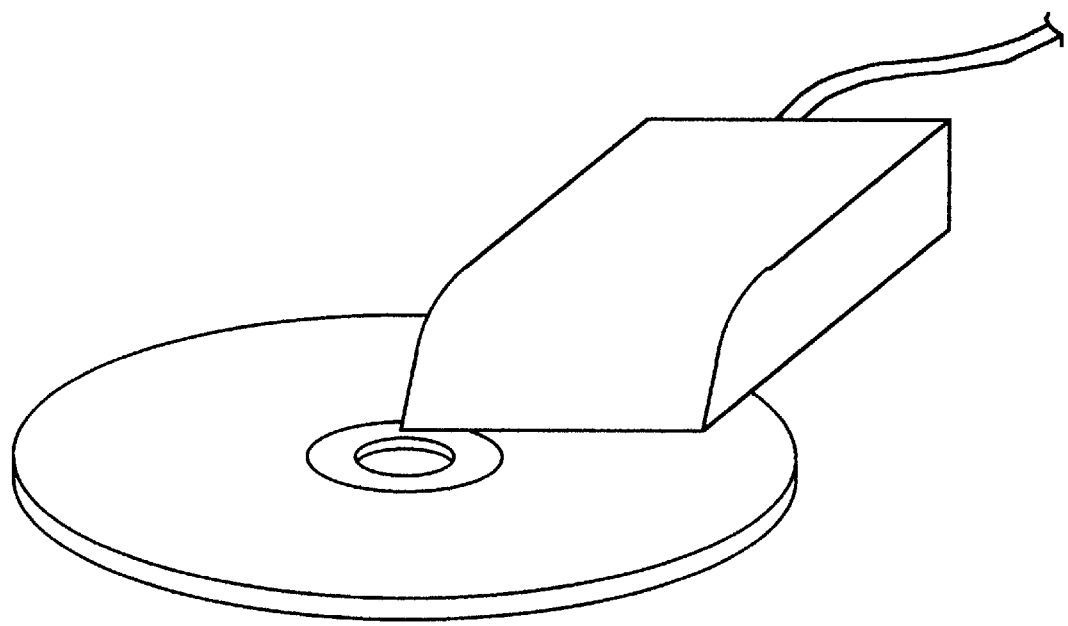
FIG. 15 is a perspective view of a magnetic tape demagnetizer.
Figure 16:
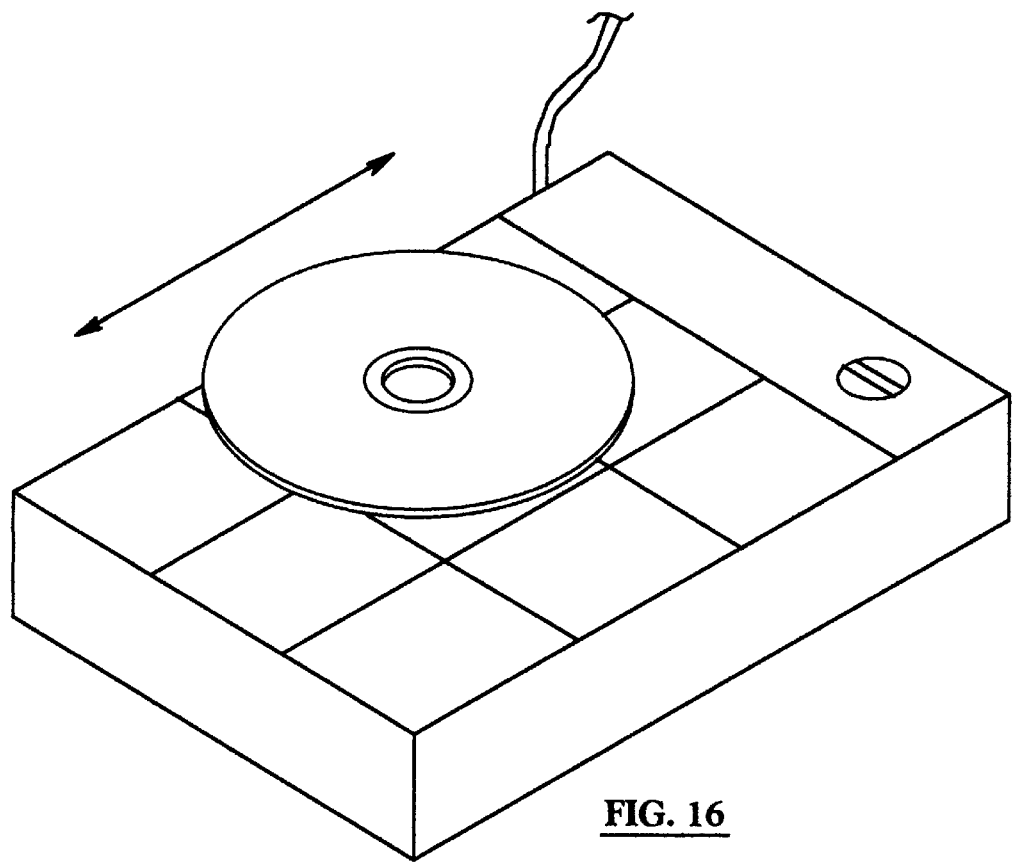
FIG. 16 is a perspective view of a machine tool demagnetizer.
Figure 17:
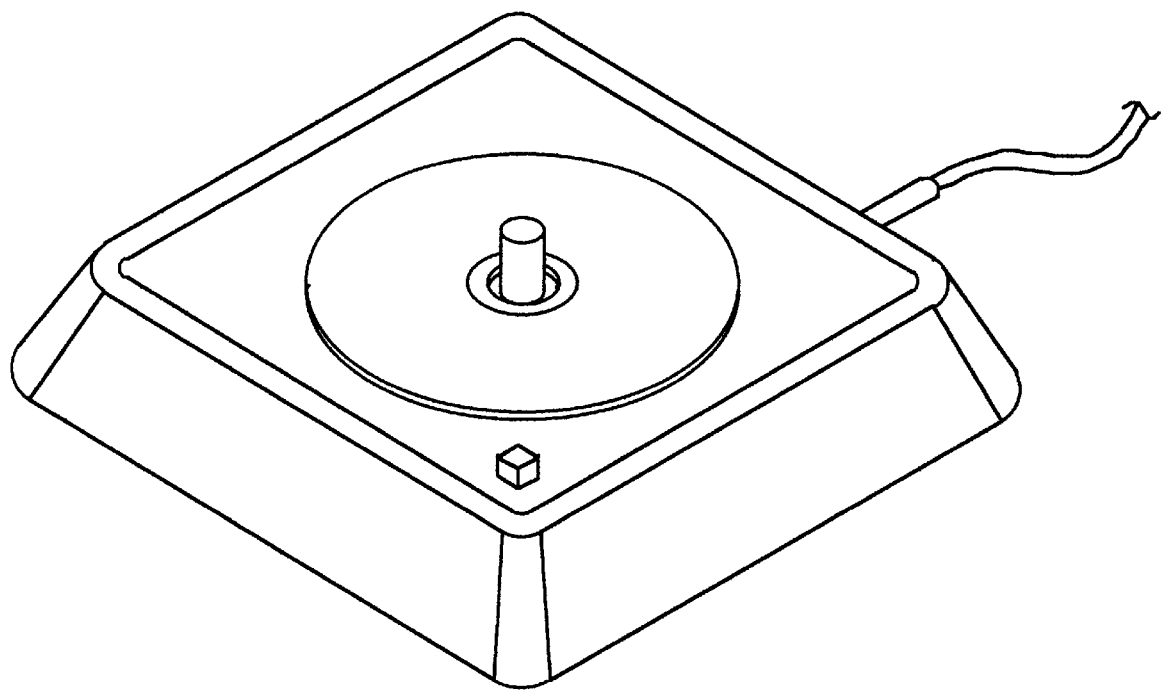
FIG. 17 is a perspective view of a CD tone quality and image quality improving apparatus.
Figure 18:
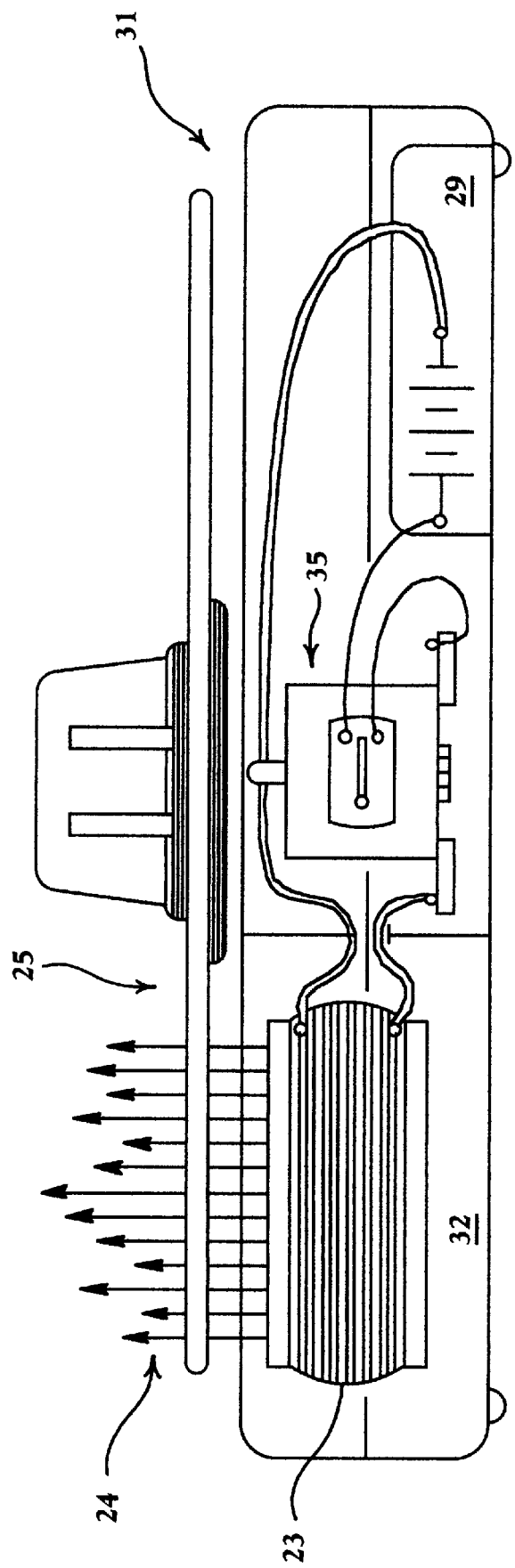
FIG. 18 is a side view of the CD tone quality and image quality improving apparatus shown in FIG. 17.
Figure 19:
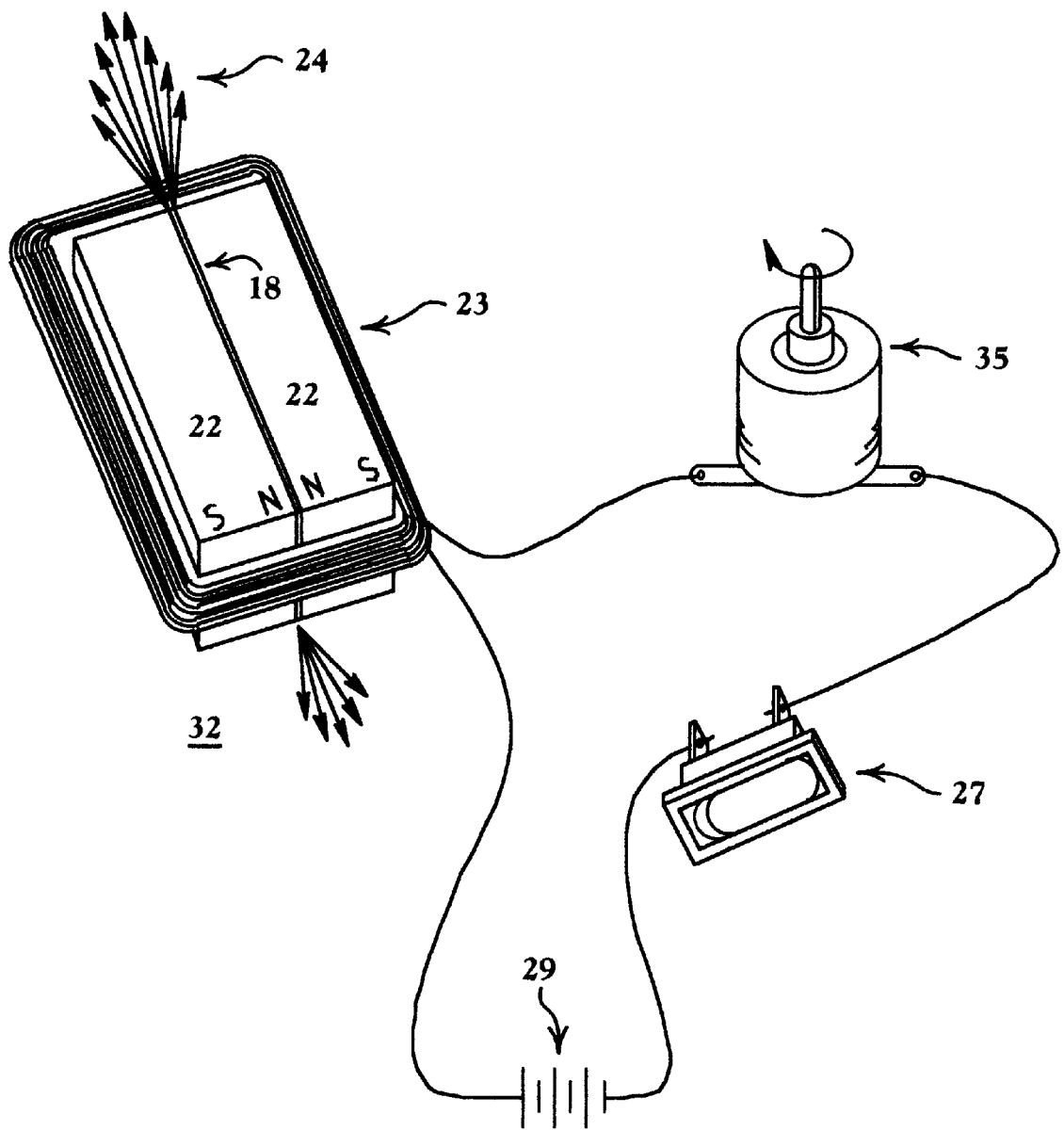
FIG. 19 is a perspective view of an apparatus used for creating a modulated electromagnetic field.

FIGS. 12 and 13 show the results of measurements of a used CD prior to and after demagnetization by the information recording disc demagnetization apparatus according to the present invention. As in the case of the above, experiments were conducted for about 40 seconds with a spectral analyzer.

Small changes can be seen in various places. For instance, in the vicinity of 20 seconds in the range of from 1 KHz to 2.5 KHz, in particular, it is clearly seen that the number of crests increases, meaning that the quantity of information actually increases as a result of demagnetization. The heights of the crests also generally increase, indicating that the respective ranges are extended.

Table 1 shows noise after demagnetization processing has been conducted on the music CD entitled "LOVE WARS/ANNIVERSARY" (recording time: 4'45") by Yumi Matsutoya, released in 1989, using the information recording disc demagnetization apparatus according to the present invention and the above-mentioned CD demagnetizer. The row labeled "noYUMI1" shows a state prior to demagnetization, the row labeled "UCFYUMI" shows a state after demagnetization using the CD demagnetizer, and the row labeled "RDYUMI" shows a state after demagnetization using the information recording disc demagnetization apparatus according to the present invention.

The output power level in decibels is designated as PWL(dB), the thorough harmonic distortion is designated THD (%), and the signal to noise ratio is designated as SNR (%)

As is obvious from Table 1, the SNR after demagnetization decreases compared to that prior to demagnetization processing by the information recording disc demagnetization apparatus according to the present invention, whereas SNR after demagnetization increases when using the CD demagnetizer.

Table 2 shows fluctuation values (dB) of sine waves at reproduction level serving as noise level when a used CD is reproduced by a service CD player (SONY CDP-3000) prior to and after demagnetization using the information recording disc demagnetization apparatus according to the present invention.

As seen in Table 2, the noise level in the low range is greatly improved. In the frequency range of 4 KHz or higher, the presence of a noise waveform is confirmed by the oscilloscope prior to demagnetization processing, and a distorted sound is heard in the high range of between 8 KHz and 12 KHz during reproduction. After demagnetization, no noise waveform is found, and it can be seen that there is no distortion in high frequency range.

Therefore, it is shown that, in contrast to the CD demagnetizer, the information recording disc demagnetization apparatus according to the present invention is capable of easily and quickly reducing or erasing the magnetism on an information recording disc such as a CD, and thereby capable of preventing deterioration in tone quality and image quality during reproduction.

As can be seen from the above description, the information recording disc demagnetization apparatus according to the present invention has the following excellent advantages:

(1) An information recording disc is reliably demagnetized by using the loop attenuation demagnetization method.

(2) Since the coil is of a disc shape having a plane area, the information recording disc can be directly mounted on the coil and uniform demagnetization is possible.

(3) Operation is simple, and the demagnetization process can be conducted in a short period of time.

(4) A simple circuit can be used since a commercial AC power supply is used as an alternating voltage source applied to a coil for creating an alternating magnetic field.

(5) There is no danger of magnetic interference with the information recording disc since demagnetization processing is conducted while the information recording disc is in a stationary state without rotation and a permanent magnet is not used.

The present invention should not be limited to the above embodiments and should be applied to all equivalents included within the scope of the claims.

Description of Reference Numerals 1 resin
2 coil
3 mount unit
4 mount unit for MD
5 voltage control unit
6 timer
7 capacitor
8 apparatus body
9 lead
10 protrusion
11 opening hole
12 power supply circuit
13 rectifier
14 switching device
15 power supply switch
16 demagnetization switch
17 indicator
18 timer circuit 19 resistor
20 information recording disc
30, 40 information recording disc demagnetization apparatus

FIG. 6.
  2 COIL
  5 CAPACITOR
  13 RECTIFIER
  6(18) VR TIMER

FIG. 8
  VECTOR VALUES OF INTENSITY OF MAGNETIC FIELD
  CENTER
  VECTOR VALUE OF INTENSITY OF MAGNETIC FIELD
  DISTANCE FROM CENTER OF COIL

FIG. 10
  TIME
  FREQUENCY (Hz)
  RELATIVE AMPLITUDE (dB)

TABLE 1

| CD state | PW L (db) | THD (%) | SNR (%) |
|---|---|---|---|
| no YUMI1 | −13.36 | 72.11 | 2.047 |
| UCFYUMI | −13.36 | 71.75 | 2.117 |
| RDYUMI | −13.94 | 70.99 | 1.866 |

TABLE 2

| | SONY CDP-3000 | | | P A presense/absence of noise by Oscilloscope | |
|---|---|---|---|---|---|
| Hz | prior-to | after | difference | prior-to | after |
| 20 | 8.25 | 8.00 | 0.25 | P | A |
| 31.5 | 5.75 | 1.00 | 4.75 | P | P |
| 63 | 1.75 | 1.0 | 0.75 | P | P |
| 125 | 1.25 | 1.0 | 0.25 | P | P |
| 250 | 1.0 | 0.75 | 0.25 | P | P |
| 400 | 0.5 | 0.25 | 0.25 | P | P |
| 500 | 0.25 | 0.25 | 0.0 | P | P |
| 1K | 0.25 | 0.0 | 0.25 | P | A |
| 2K | 0.25 | 0.0 | 0.25 | P | P |
| 3.15K | 0.25 | 0.25 | 0.0 | P | P |
| 4K | 0.0 | 0.0 | 0.0 | P | A |
| 8K | 0.25 | 0.25 | 0.0 | P | A |
| 10K | 0.0 | 0.0 | 0.0 | P | A |
| 12.5K | 0.25 | 0.25 | 0.0 | P | A |
| 16K | 0.25 | 0.25 | 0.0 | P | A |
| 20K | 0.0 | 0.0 | 0.0 | P | A |

What is claimed is:

1. An information recording disc demagnetization apparatus for reducing or erasing magnetism magnetized on an information recording disc, said apparatus comprising a means for creating an alternating magnetic field having a decremental intensity, and a means for holding said information recording disc in a stationary state within said alternating magnetic field.

2. The information recording disc demagnetization apparatus according to claim 1, wherein said means for creating an alternating magnetic field having a decremental intensity comprises a coil wound into disc shape, and wherein a voltage control means is provided for applying alternating voltage to the coil and decrementing the alternating voltage.

3. The information recording disc demagnetization apparatus according to claim 2, wherein said voltage control means is provided with a timer for setting time current is applied to said coil.

4. The information recording disc demagnetization apparatus according to claim 3, wherein said voltage control means is provided with a capacitor using, as an alternating voltage source, a commercial alternating current power supply applied to said coil, charged during applying current to said coil, and gradually discharged for 5 to 20 seconds after the period of time set by said timer, thereby attenuating the applied alternating voltage to a zero voltage.

5. The information recording disc demagnetization apparatus according to claim 2, wherein said means for holding said information recording disc in a stationary state within said alternating magnetic field comprises a disc-shaped coil coated with resin horizontally fixed to an upper surface of an apparatus body for directly mounting an information recording disc on the upper surface of the disc-shaped coil coated with said resin.

6. The information recording disc demagnetization apparatus according to claim 2, wherein said means for holding said information recording disc in a stationary state within said alternating magnetic field comprises a disc-shaped coil coated with resin horizontally fixed to an upper portion of an apparatus body for mounting an information recording disc on the upper surface of said apparatus body.

7. The information recording disc demagnetization apparatus according to claim 2, wherein said coil is a disc-shaped, air-core coil having an outer diameter of 110 mm to 130 mm, an inner diameter of 10 mm to 32 mm, and a thickness of 3 to 12 mm, and wherein said coil is wound spirally from a vicinity of a center toward an outer periphery.

8. An information recording disc demagnetization apparatus according to claim 3, wherein said coil is a disc-shaped, air-core coil having an outer diameter of 110 mm to 130 mm, an inner diameter of 10 mm to 32 mm, and a thickness of 3 to 12 mm, and wherein said coil is wound spirally from a vicinity of a center toward an outer periphery.

9. An information recording disc demagnetization apparatus according to claim 4, wherein said coil is a disc-shaped, air-core coil having an outer diameter of 110 mm to 130 mm, an inner diameter of 10 mm to 32 mm, and a thickness of 3 to 12 mm, and wherein said coil is wound spirally from a vicinity of a center toward an outer periphery.

10. An information recording disc demagnetization apparatus according to claim 5, wherein said coil is a disc-shaped, air-core coil having an outer diameter of 110 mm to 130 mm, an inner diameter of 10 mm to 32 mm, and a thickness of 3 to 12 mm, and wherein said coil is wound spirally from a vicinity of a center toward an outer periphery.

11. An information recording disc demagnetization apparatus according to claim 6, wherein said coil is a disc-shaped, air-core coil having an outer diameter of 110 mm to 130 mm, an inner diameter of 10 mm to 32 mm, and a thickness of 3 to 12 mm, and wherein said coil is wound spirally from a vicinity of a center toward an outer periphery.

* * * * *